US009959120B2

United States Patent
de Cesare et al.

(10) Patent No.: US 9,959,120 B2
(45) Date of Patent: May 1, 2018

(54) PERSISTENT RELOCATABLE RESET VECTOR FOR PROCESSOR

(71) Applicant: Apple Inc., Cupertino, CA (US)

(72) Inventors: Josh P. de Cesare, Campbell, CA (US); Gerard R. Williams, III, Los Altos, CA (US); Michael J. Smith, San Francisco, CA (US); Wei-Han Lien, San Jose, CA (US)

(73) Assignee: Apple Inc., Cupertino, CA (US)

( * ) Notice: Subject to any disclaimer, the term of this patent is extended or adjusted under 35 U.S.C. 154(b) by 811 days.

(21) Appl. No.: 13/750,013

(22) Filed: Jan. 25, 2013

(65) Prior Publication Data

US 2014/0215182 A1 Jul. 31, 2014

(51) Int. Cl.
*G06F 1/32* (2006.01)
*G06F 9/32* (2018.01)
*G06F 9/30* (2018.01)

(52) U.S. Cl.
CPC .......... *G06F 9/322* (2013.01); *G06F 9/30076* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
USPC ......... 713/1, 2, 310, 323, 324, 330; 712/205
See application file for complete search history.

(56) References Cited

U.S. PATENT DOCUMENTS

| | | | |
|---|---|---|---|
| 6,038,661 A | 3/2000 | Yoshioka et al. | |
| 6,625,809 B1 * | 9/2003 | Duff | 717/169 |
| 6,704,865 B1 * | 3/2004 | Duff | 713/2 |
| 7,191,323 B2 * | 3/2007 | Takahashi | 713/1 |
| 7,290,127 B2 | 10/2007 | Schmisseur et al. | |
| 8,161,258 B2 * | 4/2012 | Doran et al. | 711/163 |
| 8,234,489 B2 | 7/2012 | Williamson et al. | |
| 2005/0283598 A1 * | 12/2005 | Gaskins et al. | 713/2 |
| 2006/0085629 A1 * | 4/2006 | Swanson et al. | 713/1 |
| 2006/0095726 A1 * | 5/2006 | Zaabab et al. | 712/205 |

OTHER PUBLICATIONS

Reset Vector, <http://en.wikipedia.org/wiki/Reset_vector>, accssed Jul. 8, 2013.*

* cited by examiner

*Primary Examiner* — Zahid Choudhury
(74) *Attorney, Agent, or Firm* — Meyertons, Hood, Kivlin, Kowert & Goetzel, P.C.; Lawrence J. Merkel (57) ABSTRACT

In an embodiment, an integrated circuit includes at least one processor. The processor may include a reset vector base address register configured to store a reset vector address for the processor. Responsive to a reset, the processor may be configured to capture a reset vector address on an input, updating the reset vector base address register. Upon release from reset, the processor may initiate instruction execution at the reset vector address. The integrated circuit may further include a logic circuit that is coupled to provide the reset vector address. The logic circuit may include a register that is programmable with the reset vector address. More particularly, in an embodiment, the register may be programmable via a write operation issued by the processor (e.g. a memory-mapped write operation). Accordingly, the reset vector address may be programmable in the integrated circuit, and may be changed from time to time.

20 Claims, 4 Drawing Sheets

PERSISTENT RELOCATABLE RESET VECTOR FOR PROCESSOR

BACKGROUND

Field of the Invention

This invention is related to processors and, more particularly, to resetting processors and vectoring after reset.

Description of the Related Art

Processors are generally used in digital systems of various types to control other hardware in the system and to execute software to provide desired functionality for the user. When the digital system is first powered on, typically the processor is reset via assertion of a reset signal to the processor. The reset causes the processor to initialize to a known state from which execution can begin. The processor can then be released from reset. In response to the release from reset, the processor can begin instruction execution beginning at a known address. The known address is referred to as the reset vector address, or more briefly the reset vector. Instructions stored at the reset vector address can be executed to initialize the processor resources, various other hardware resources in the system, etc. One or more instructions that are executable by a processor to perform a task or tasks are collectively referred to as code, or a program, in this description.

Originally, the reset vector address was hardwired in the processors. While the hardwiring of the reset vector address provides predictability and simplicity, the hardwiring is inflexible. Different systems may be more amendable to having the reset vector at different addresses. To address this, some processors are configured to receive a reset vector address on an input to the processor. The input is hardwired in the system to be the reset vector address that is desired by that particular system. While the processor is more flexible for use in different systems, a given system is still required to have a hardwired reset vector address.

SUMMARY

In an embodiment, a system includes an integrated circuit having at least one processor. The processor may include a reset vector base address register configured to store a reset vector address for the processor. Responsive to a reset, the processor may be configured to capture a reset vector address on an input to the processor, updating the reset vector base address register with the provided reset vector address. Upon release from reset, the processor may initiate instruction execution at the reset vector address. The integrated circuit may further include a logic circuit that is coupled to provide the reset vector address. The logic circuit may include a register that is programmable with the reset vector address. More particularly, in an embodiment, the register may be programmable via a write operation issued by the processor (e.g. a memory-mapped write operation). Accordingly, the reset vector address may be programmable in the integrated circuit, and may be changed from time to time. In an embodiment, the processor may be powered up and down while the integrated circuit remains powered. The logic circuit may be configured to remain powered when the integrated circuit is powered (i.e. even if the processor is powered down). After each power up, the processor may be reset. Accordingly, the most recently programmed reset vector address from the register in the logic circuit may be used by the processor as the reset vector address for subsequent resets.

The flexibility permitted by the above structure may have a variety of uses, in various embodiments. For example, the reset code may be periodically relocated for security purposes. That is, if the reset vector address became known, it is possible that nefarious actors could corrupt the reset code to take control of the system and/or cause damage to the system or data stored on the system. By relocating the reset vector address periodically, such actors may be defeated or inhibited. As another example, if the reset code may be relocated in memory, the page that is storing the reset code may be reclaimed for use by other instructions/data in the system. If the reset code is expected to be needed again (e.g. if the processor is being powered down), a new page may be allocated anywhere in memory and the reset vector address may be programmed to point to the newly-allocated page.

As yet another example, different reset code may be executed at different times. The initial boot of a system including the integrated circuit may execute one version of the reset code, and subsequent resets of the processor (between which the integrated circuit and/or the system have not been powered off) may execute a different version of the reset code. Subsequent resets of the processor may not require as much initialization in the system (at least portions of which remained powered on in the interim that the processor is powered off), and thus the reset code may be shorter and/or may be executed more quickly than the initial reset code.

In an embodiment, there may be more than one processor in the integrated circuit. The logic circuit may optionally include a different register for each processor, allowing different processors to have different reset code.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component.

DETAILED DESCRIPTION OF EMBODIMENTS

Figure 1:
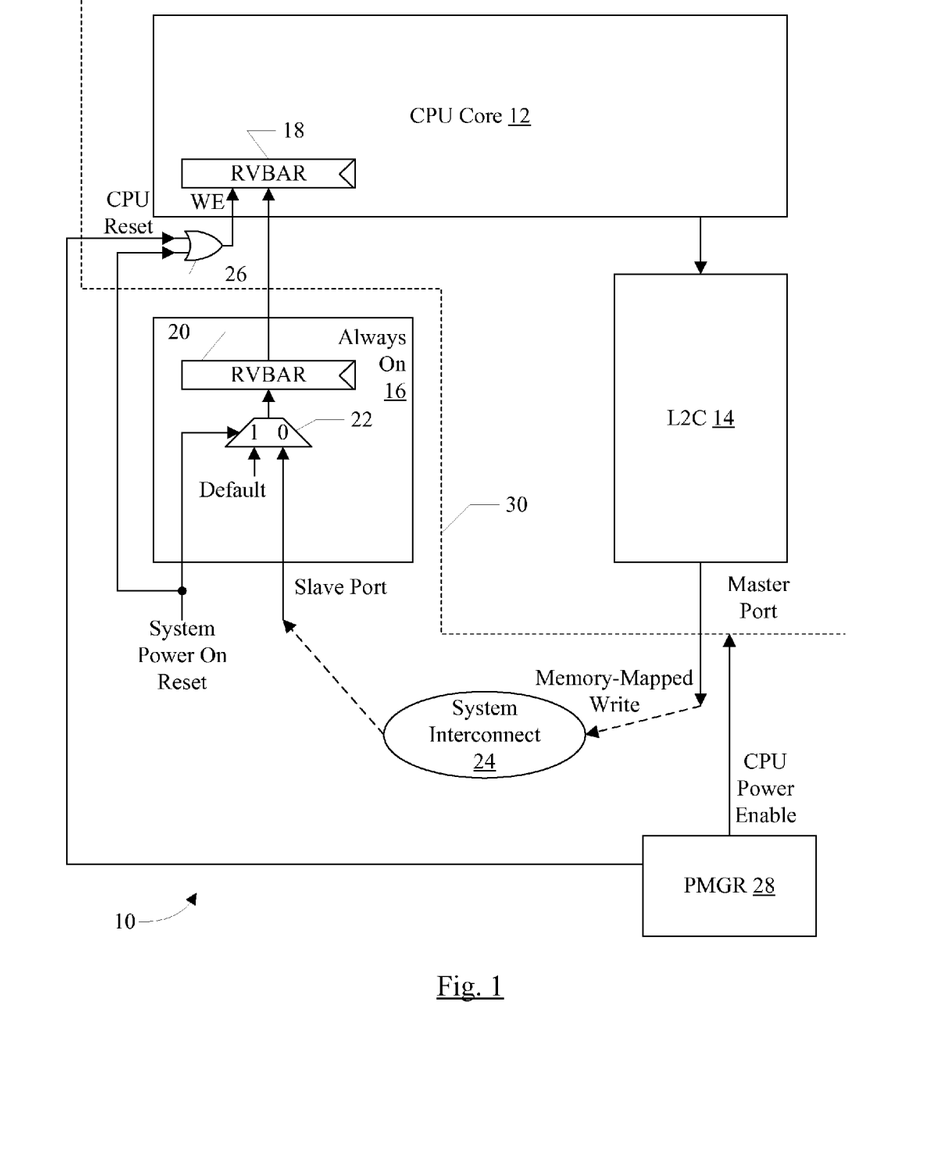
FIG. 1 is a block diagram of one embodiment of an integrated circuit including a processor and an external reset vector base address register.

Turning now to FIG. 1, a block diagram of a portion of one embodiment of an integrated circuit 10 is shown. In the illustrated embodiment, the integrated circuit 10 includes a processor core 12 (which may serve as a central processing unit, or CPU, in the integrated circuit 10 in this embodiment) coupled to a level 2 cache (L2C) 14 and an "always on" logic circuit 16. The CPU core 12 includes a reset vector base address register (RVBAR) 18, and the always on circuit 16 includes a corresponding RVBAR register 20. The RVBAR register 18 is coupled to receive a reset vector address on input pins to the CPU core 12, which is coupled to the RVBAR register 20 in the always on circuit 16 in this embodiment. The input to the RVBAR register 20 is coupled to a multiplexor (mux) 22, which has inputs coupled to receive a default reset vector address and a slave port input to the always on circuit 16. The slave port input is coupled to a system interconnect 24. The L2C 14 is coupled to a master port to the system interconnect 24. The selection control to the mux 22 may be a system power on reset input, which is also coupled as an input to an OR gate 26. The other input to the OR gate 26 may be coupled to receive a CPU reset. The output of the OR gate 26 may be a write enable to the RVBAR register 18. In the illustrated embodiment, the integrated circuit 10 further includes a power manager (PMGR) circuit 28, which may control a CPU power domain that includes the CPU core 12 and the L2C 14, in this embodiment. The boundary of the CPU power domain is illustrated by dotted line 30 in FIG. 1. The PMGR circuit 28 is shown is providing a CPU power enable to the CPU power domain to represent the PMGR circuit 28 controlling the CPU power domain. In the illustrated embodiment, the CPU reset may also be controlled by the PMGR circuit 28.

Each time the CPU core 12 is powered up, it may be reset to ensure that a known state is established in the CPU core 12 prior to initiating instruction execution. The initial power up of the CPU core 12 may occur when the integrated circuit 10 as a whole is initially powered up. The integrated circuit 10 may have an input coupled to receive the system power on reset signal, and the entirety of the integrated circuit 10 may be reset in response to assertion of the system power on reset signal. To provide a reset vector address at initial power up, the mux 22 may select the default address as an input to the RVBAR register 20. The default address may be fixed (e.g. hardwired) in the integrated circuit 10, or may be provided on input pins to the integrated circuit 10, in various embodiments. Default reset code that initializes the system as a whole may be stored at the default address, for example, and may be executed at system start up. The RVBAR register 20 may capture the default address and provide the default address on the input of the CPU core 12, to the RVBAR register 18. Responsive to the reset, the RVBAR register 18 may capture the default address. Responsive to the CPU core 12 being released from reset, the CPU core 12 may initiate instruction execution from the default address.

On the other hand, if the system power on reset is not in progress, the mux 22 may select the slave port input to the RVBAR register 20. If a write operation is being received on the slave port, and the write operation is targeting the RVBAR register 20, the always on circuit 16 may cause the RVBAR register 20 to update with the data from the write operation. The write data may be the reset vector address being programmed into the RVBAR register 20 by the write operation. If a write operation targeting the RVBAR register 20 is not received on the slave port, then the RVBAR register 20 may continue to store the default address (or other reset vector address that was previously written to the register 20). Accordingly, absent a write operation to change the reset vector address, the default address may be used for each subsequent reset (e.g. similar to typical fixed reset vector implementation). Additionally, by providing the register 20 and the ability to write the register 20, other reset vector addresses may be used.

In the illustrated embodiment, the RVBAR register 20 is memory mapped and thus a write operation targeting the RVBAR register 20 may be detected by decoding the address of the write operation. The address decoding may be performed by circuitry in the system interconnect 24, to route the write operation to the always on circuit 16 and/or by the always on circuit 16 to accept the write operation from the slave port and to update the RVBAR register 20. There may be other registers in the always on circuit 16 that are memory mapped to other addresses, and there may be other registers/resources in the system that are memory mapped to other addresses as well. Generally, a register/resource may be memory mapped if an address within the memory address space is assigned to the register/resource. The memory address may be used with a write operation (e.g. a store instruction) by software to update the resource, or with a read operation (e.g. a load instruction) to access the resource. Other embodiments may target the register 20 in other fashions (e.g. a programmed input/output (PIO) operation, a dedicated instruction such as a special purpose register read/write instruction, etc.).

As mentioned above, the RVBAR register 18 may capture the reset vector address in response to a reset of the CPU core 12, and may initiate instruction execution at the reset vector address responsive to being released from reset. When reset is asserted, most register state in the CPU core 12 may be reset to a known value. In some embodiments, the RVBAR register 18 may not be reset due to the assertion of reset inputs. Instead, the register 18 may use the reset assertion as a write enable to capture the input value from the input to the CPU core 12. In other embodiments, the register 18 may be reset, but may capture the reset vector address at the deassertion of reset and before generating the first fetch address to fetch instructions for execution. Either of these mechanisms may be viewed as capturing the reset vector address responsive to reset. Being released from reset may generally refer to the CPU core 12 being permitted to begin execution after reset is complete. The release may occur responsive to the deassertion of the reset signal, or may occur via another control signal which may be asserted (e.g. a start signal) to indicate that the CPU core 12 may proceed.

The reset signals may be defined to be asserted at a logic high level and deasserted at a logic low level, or vice versa. The OR gate 26 in FIG. 1 indicates that the resets are asserted high, but other logic gates may be used if the reset signals are defined to be asserted low (e.g. a NAND gate may be used).

FIG. 1 illustrates the input to the CPU core 12 for the RVBAR register 18 being continuously coupled to the RVBAR register 20. In some embodiments, the input may be multiplexed with other inputs to the CPU core 12. During reset, the input may be the reset vector address to be captured by the RVBAR register 18. At other times, the input may be used for one or more other signals used as inputs/outputs by the CPU core 12. In such embodiments, the always on circuit 16 may include a tristateable output driver to drive the input to the CPU core 12. The tristateable driver may be enabled (driving) during reset and disabled (not driving) at other times. During normal operation (i.e. not reset), other circuitry may drive the signals corresponding to the reset vector address inputs according to the definition of the signals for normal operation.

As illustrated in FIG. 1, the CPU core 12 may be configured to generate the memory-mapped write operation to update the reset vector address in the RVBAR register 20. Thus, the code executing on the CPU core 12 itself may program the reset vector address for subsequent resets of the CPU core 12. Other devices/processors in the system may be configured to generate a memory mapped write to update the RVBAR register 20 (or other memory mapped registers in the always on circuit 16) as well.

While the RVBAR register 20 is writeable via the memory-mapped operation, in one embodiment the RVBAR register 18 may be read-only. That is, instructions executed by the CPU core 12 may not be able to update the RVBAR register 18 directly. In some embodiments, the RVBAR register 18 may not be readable via instruction execution, either, or may only be readable by instructions executing in privileged mode on the CPU core 12.

The PMGR circuit 28 may be configured to control the power down of the CPU power domain (including the L2C 14 and the CPU core 12 in FIG. 1) and the power up as well. The PMGR circuit 28 may included various monitor circuitry to determine if the CPU power domain should be powered down and/or software executing on the CPU core 12 or another processor (not shown in FIG. 1) may control the PMGR circuit 28, indicating when power up and power down should be performed. The PMGR circuit 28 may enable the CPU power domain if the CPU core 12 is to be powered up (or remain powered up) and may disable the CPU power domain if the CPU core 12 is to be powered down. The CPU power enable signal may logically represent this control in FIG. 1 (e.g. the CPU power enable may be asserted to enable the CPU power domain and deasserted to disable the CPU power domain), although the actual mechanism of powering up and down may be controlled in various fashions. For example, there may be a separate power input to the integrated circuit 10 for the CPU power domain, and the PMGR circuit 28 may be configured to communicate with an external power supply to power up and down. Generally, a power domain may refer to the set of circuitry that is to be powered up and powered down together. That is, the circuitry in the power domain may be treated as a unit for powering up and powering down. Powering up may refer to supplying a supply voltage to the circuit (e.g. powering the circuit on), and powering down may refer to removing the supply voltage (e.g. powering the circuit off). There may be various supply voltage magnitudes supported by a power domain that is powered up, and changes between the magnitudes may be made as desired while the power domain is powered up (e.g. for power conservation purposes). The always on circuit 16 may be viewed as being in a different power domain than the CPU power domain, where the different power domain is independent of the CPU power domain.

The PMGR circuit 28 may also manage the CPU reset for the CPU core 12, ensuring that a reset occurs responsive to a power up of the CPU power domain. Resets can be performed at other times as well, as desired. Software may be configured to cause a CPU reset as well (e.g. by writing a designated memory mapped address in the PMGR circuit 28).

The CPU core 12 may include the hardware circuitry and/or microcode (in some embodiments) that implements an instruction set architecture corresponding to the CPU. That is, the CPU core 12 may include the circuitry to fetch instructions, execute the instructions, and otherwise interact with the rest of the system to implement the operation defined for each instruction in the instruction set architecture. The CPU core 12 may include caches and circuitry to interface to the rest of the system. The boundary of the CPU core 12 may thus represent the circuitry implementing the instruction set architecture and a defined interface to other components in the system (e.g. a bus interface, a packet based interface, etc.). The input to the CPU core 12 on which the reset vector address is provided is part of the defined interface. Accordingly, the CPU core 12 may be viewed as having "pins" even though the CPU core 12 may not be separately packaged as a standalone integrated circuit. Accordingly, a CPU core 12 may be the CPU circuitry included in an integrated circuit with other components. More generally, a processor core may be the processor circuitry included in an integrated circuit. A CPU or processor may generally refer to a core or a standalone integrated circuit in various embodiments.

In one embodiment, the integrated circuit 10 may include various other components with the processor cores as a system on a chip (SoC) configuration. Other embodiments may include other amounts of integration and/or discrete implementations.

The L2C 14 may be a cache of any size, configuration, and geometry. The CPU core 12 may include one or more caches, and thus the L2C 14 is referred to as a level 2 cache in this embodiment. Other embodiments may include more caches in a hierarchy (e.g. level 3, level 4, etc.). In still other embodiments, there may be no L2C 14 and the CPU core 12 may be coupled to the master port on the system interconnect 24. While the L2C 14 is shown as included in the CPU power domain in this embodiment, the L2C 14 may be in a separate power domain (that may be separately managed from the CPU power domain) in other embodiments. In still other embodiments, the L2C 14 may be in an always on power domain. Generally, a power domain may be "always on" if the power domain is powered up at any time that the integrated circuit 10 is powered up.

Because the always on circuit 16 is powered up whenever the integrated circuit 10 is powered, the RVBAR register 20 may persist the reset vector address across power down/power up cycles of the CPU core 12. Viewed in another way, the reset vector address may be viewed as non-volatile over CPU power down/power up cycles. In an embodiment, the always on circuit 16 may include debug support circuitry for the CPU core 12. By remaining powered on while the CPU core 12 is powered off, the debug support circuitry may more easily permit a user to debug across CPU power down/power up cycles.

The system interconnect 24 may be any interconnect configured to couple various components in the integrated circuit 10. The interconnect may be bus-based, point-to-point, packet-based, etc. In embodiments in which cache coherence is maintained, the interconnect may include a coherence point at which order among the transactions issued from various sources is established. In the illustrated embodiment, the interconnect may include a master port for each transaction initiator (e.g. the CPU core 12, through the L2C 14, in this example) and a slave port for each transaction receiver (e.g. the CPU complex may be a slave, and more particularly the always on circuit 16 may be a slave for memory mapped writes/reads to the RVBAR register 20). Other slave ports may be coupled to a memory controller configured to couple to a memory system, various peripheral, etc. Other master ports may be coupled to various peripherals, other processors (including other CPUs, in some embodiments), etc.

In one embodiment, the reset vector address may be a base address defining a location from which offsets may be used to locate various reset code to be executed in response to various resets or other system state. In other embodiments, the reset vector address may define the start of the reset code. Thus, instruction fetch after being released from reset may be responsive to the reset vector address, to include both fetching from the reset vector address and fetching from an offset to the reset vector address.

Figure 2:
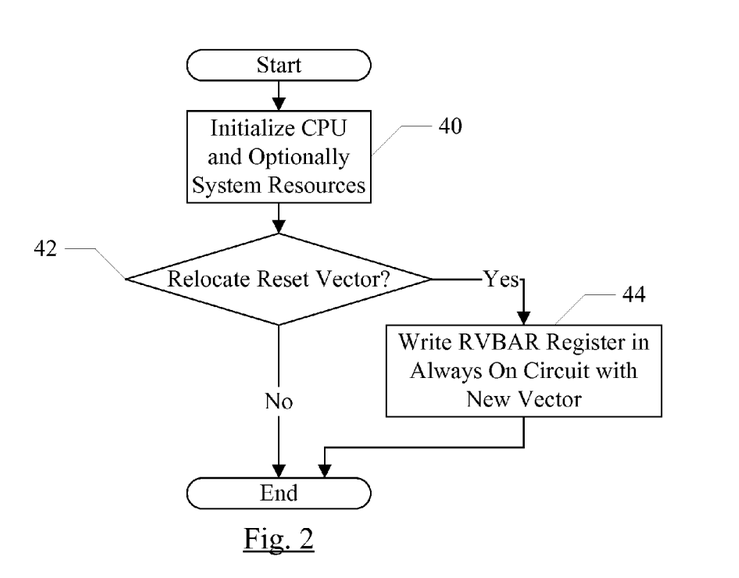
FIG. 2 is a flowchart illustrating operation of one embodiment of code executed at a reset vector address.

Turning next to FIG. 2, a flowchart is shown illustrating operation of one embodiment of reset code executable by the CPU core 12. That is, the reset code may be code located at the reset vector address. While the blocks are shown in a particular order for ease of understanding, other orders may be used. The reset code may include instructions which, when executed by the CPU core 12, implement the operation described for the flowchart.

The reset code may initialize various CPU resources in the CPU core 12 for normal operation (block 40). In some embodiments, the reset code may optionally initialize other resources in the integrated circuit 10 and or the system including the integrated circuit 10. The initialization of the other resources may be optional because the reset may not be a full system reset, but rather may be a CPU reset (e.g. because the CPU core 12 is being powered up). In one embodiment, there may be two sets of reset code, one to be executed on a system reset (and stored at the default reset vector address) and one to be executed on a CPU reset (and stored at a different reset vector address). The default reset code may include system initializations and the CPU reset code may not. Alternatively, there may be some system initializations that are performed at CPU reset as well, while others are not.

The reset code may also determine if the reset vector address is to be relocated (decision block 42). In the above example, the reset vector address may be relocated if it is the default reset vector address, so that subsequent resets may execute the alternate reset code unless another full system reset occurs. In another example, the reset vector address may be relocated for security purposes. A variety of methods may be used to determine if the reset vector address is to be relocated for security purposes. For example, the reset vector address may be changed (and the reset code relocated as well) every N resets, where N is an integer. The reset vector address may be changed if a security breach has been detected. For example, the integrated circuit 10 may be designed for a networked device such as a cellular phone, personal digital assistant, tablet computer, laptop computer, personal computer, etc. The networked device may check a central server on the network (e.g. the Internet, an intranet, etc.) to determine if a security breach has occurred on other devices, and thus the reset vector should be changed. As another example, a device may determine that a security breach has occurred based on its physical location, failed passcode/password attempts to login to the device, etc. There may be other reasons to relocate the reset vector address in various embodiments. If the reset vector address is to be relocated (decision block 42, "yes" leg), the reset code may write the RVBAR register 20 in the always on circuit 16 with the newly-desired reset vector address (block 44).

Figure 3:
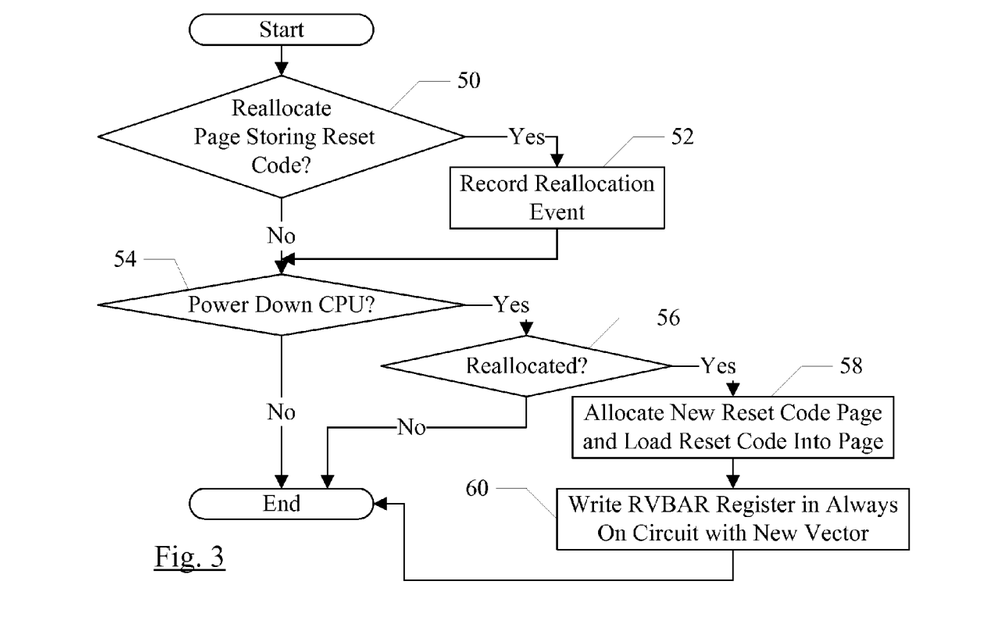
FIG. 3 is a flowchart illustrating operation of one embodiment of code that pages out the reset code and reallocates the reset code to a different page.

Turning next to FIG. 3, a flowchart is shown illustrating operation of one embodiment of code executable by the CPU core 12. While the blocks are shown in a particular order for ease of understanding, other orders may be used. The code may include instructions which, when executed by the CPU core 12, implement the operation described for the flowchart. The code corresponding to the operation of FIG. 3 may include code stored in different locations, and executed at different times, but is shown in FIG. 3 for simplicity as one flowchart.

The code may determine that the page (or pages) storing the reset code is to be reallocated to store other instructions/data (generically "data") for use by the CPU core 12 or another component of the system (decision block 50, "yes" leg). Reclaiming the page or pages that store the reset code may permit more efficient use of the overall memory space in the system, for example, since the reset code may only be executed at reset. In response to determining that the page or pages are to be reallocated, the code may record the reallocation event (e.g. in a predefined memory location or in a register—block 52). Subsequently, if the CPU core 12 is to be powered down (decision block 54, "yes" leg), the code may check the reallocation event to determine if the reallocation has occurred (decision block 56). If so (decision block 56, "yes" leg), the code may prepare for the CPU reset that would occur on a subsequent power up of the CPU core 12 by allocating a page to store the reset code (block 58), loading the reset code into the page, and writing the RVBAR register 20 with the reset vector address pointing to the page (block 60). In this case, the flexibility of reprogramming the reset vector address may permit the allocation of a page that is not in use, or that is a good choice based on the algorithm implemented for page reclaiming, rather than requiring the original page that stored the reset code to be reallocated.

Figure 4:
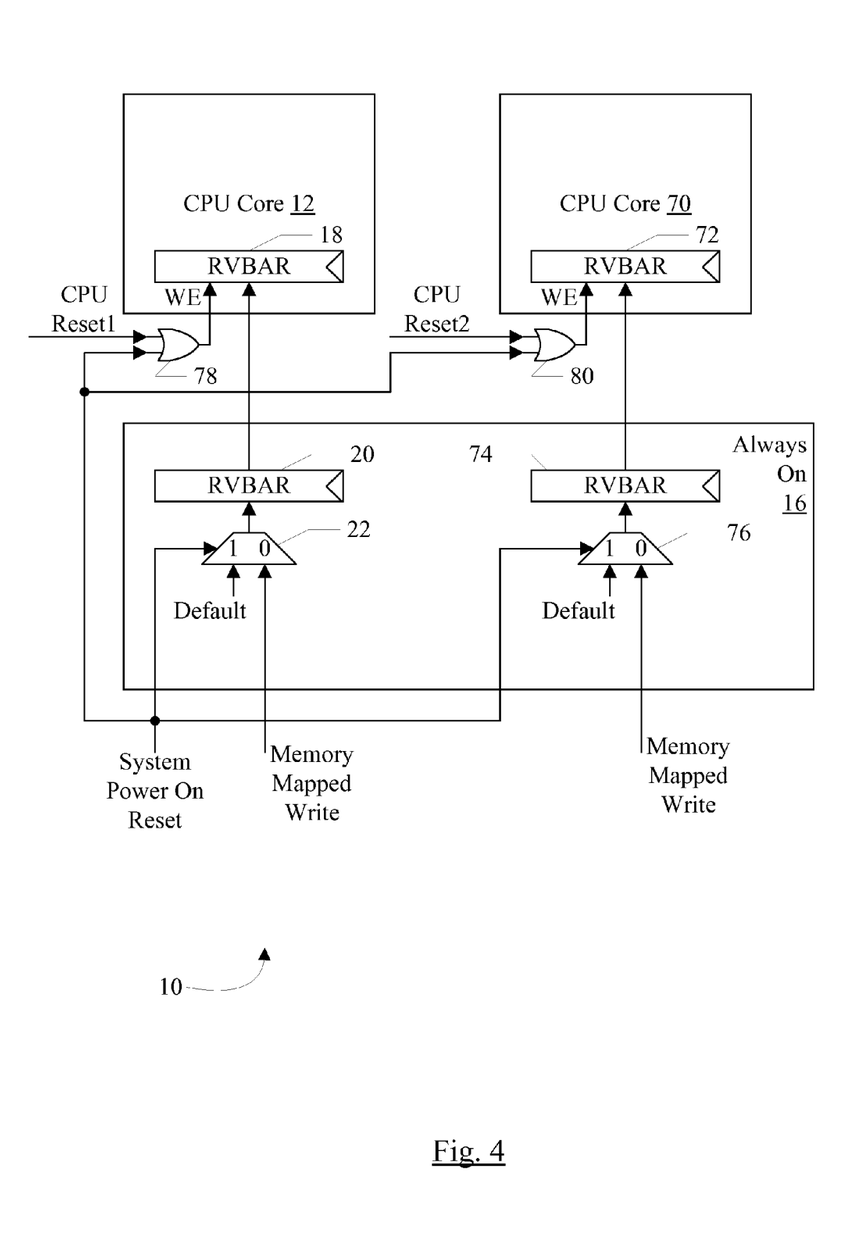
FIG. 4 is a block diagram of one embodiment of a portion of an integrated circuit including multiple cores and corresponding external reset vector base address registers.

Turning now to FIG. 4, a block diagram of another embodiment of a portion of the integrated circuit 10 is shown. In the embodiment shown, the integrated circuit 10 includes the CPU core 12 with the RVBAR register 18 and the always on circuit 16 with the RVBAR register 20 and mux 22, similar to the embodiment of FIG. 1. Additionally, the embodiment of FIG. 4 includes a second CPU core 70. The second CPU core 70 has an RVBAR register 72, and the always on circuit 16 includes a corresponding RVBAR register 74 coupled to the RVBAR register 72 in a manner similar to the registers 18 and 20. The mux 76 is coupled to the register 74, a default reset vector address, and a reset vector from a memory mapped write operation similar to the mux 22.

In the embodiment of FIG. 4, the always on circuit 16 includes separate RVBAR registers 20 and 74 for each CPU core 12 and 70. Accordingly, each CPU core may have a different reset vector address, if desired, by programming the respective RVBAR registers 20 and 74 differently. Other embodiments may include more than two CPU cores, and each core may have a separate RVBAR register within the always on circuit 16. Alternatively, some cores may share an RVBAR register within the always on circuit 16. For example, one CPU core may be considered to be the boot core, and that core may be booted first and may have its own RVBAR registers. The remaining CPU cores may share a different RVBAR register.

The default reset vector addresses for each RVBAR 20 and 74 may be different, in an embodiment, or may be the same, in another embodiment. Each RVBAR register 20 and 74 may be memory mapped to a different address, so that the register 20 and 74 may be written separately. In the illustrated embodiment, the CPU cores 12 and 70 may be reset individually (e.g. there are separate CPU reset signals input to OR gates 78 and 80, respectively).

Figure 5:
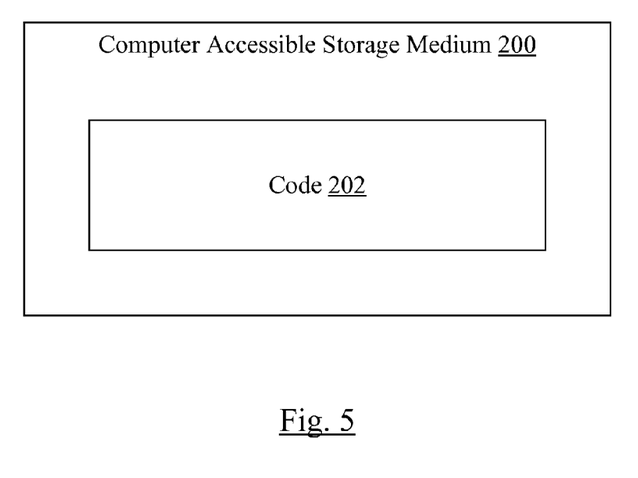
FIG. 5 is a block diagram of one embodiment of a computer accessible storage medium.

Turning now to FIG. 5, a block diagram of one embodiment of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 5 may store code 202. The code 202 may include the reset code described above with regard to FIG. 2 and/or the code described with regard to FIG. 3. The code 202 may further include any other code, as desired. The code 202 may include instructions which, when executed by a CPU core 12 or 70, implement the operation described for various code above, particularly with regard to FIGS. 2 and 3. A carrier medium may include computer accessible storage media as well as transmission media such as wired or wireless transmission.

Figure 6:
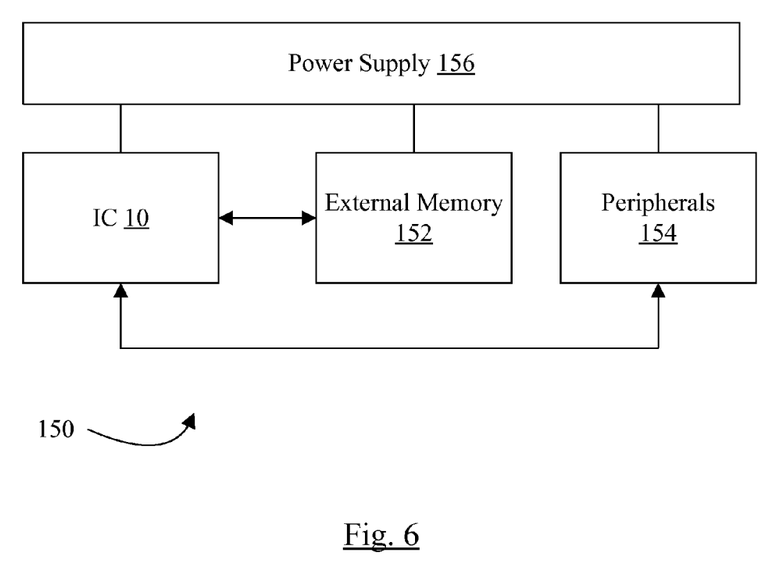
FIG. 6 is a block diagram of one embodiment of a system including the integrated circuit shown in FIG. 1.

Turning next to FIG. 6, a block diagram of one embodiment of a system 150 is shown. In the illustrated embodiment, the system 150 includes at least one instance of the integrated circuit 10 coupled to one or more peripherals 154 and an external memory 152. A power supply 156 is provided which supplies the supply voltages to the integrated circuit 10 as well as one or more supply voltages to the memory 152 and/or the peripherals 154. In some embodiments, more than one instance of the integrated circuit 10 may be included (and more than one memory 152 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 152 may include any type of memory. For example, the external memory 152 may be SRAM, dynamic RAM (DRAM) such as synchronous DRAM (SDRAM), double data rate (DDR, DDR2, DDR3, etc.) SDRAM, RAMBUS DRAM, etc. The external memory 152 may include one or more memory modules to which the memory devices are mounted, such as single inline memory modules (SIMMs), dual inline memory modules (DIMMs), etc. Alternatively, the external memory 152 may include one or more memory devices that are mounted on the integrated circuit 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. An apparatus comprising:
a processor including a reset vector base address register, wherein the processor is configured to update the reset vector base address register with a reset vector address provided on an input to the processor, wherein the processor is configured to update the reset vector base address register responsive to a reset of the processor, and wherein the processor is configured to initiate instruction fetching responsive to the reset vector address in the reset vector base address register and responsive to being released from reset, wherein the processor is released from reset responsive to a reset of the processor completing; and
a logic circuit that remains powered on if the apparatus is powered on, wherein the processor is configured to be powered down intermittently while the apparatus is powered on, wherein the processor is powered down by interrupting a power supply voltage to the processor and the processor is powered up by restoring the power supply voltage to the processor, wherein the logic circuit includes a second register, wherein the second register is coupled to the input to the processor to supply the reset vector address to the reset vector base address register, and wherein the second register is memory-mapped to permit update by instructions executable by the processor.

2. The apparatus as recited in claim 1 wherein the logic circuit is configured to update the second register with a default reset vector address responsive to a reset of the apparatus.

3. The apparatus as recited in claim 2 wherein the logic circuit is configured to retain the reset vector address in the second register responsive to the reset of the processor when the apparatus is not being reset, whereby the reset vector address written by instructions executed on the processor prior to the reset of the processor is persisted.

4. The apparatus as recited in claim 1 further comprising a second processor having a second reset vector base address register, wherein the second processor is configured to update the second reset vector base address register with a second reset vector address provided on an input to the second processor, wherein the second processor is configured to update the second reset vector base address register responsive to a reset of the second processor, and wherein the second processor is configured to initiate instruction fetching responsive to the second reset vector address in the second reset vector base address register responsive to being released from reset.

5. The apparatus as recited in claim 4 wherein the logic circuit further comprises a third register coupled to provide the second reset vector address on the input to the second processor.

6. A method comprising:
programming a register in a logic circuit that is included in an integrated circuit and that is external to a processor in the integrated circuit with a reset vector address, wherein the programming is responsive to one or more instructions executed on the processor;
powering down the processor subsequent to the programming, wherein the powering down the processor includes interrupting a power supply voltage to the processor;
persisting the reset vector base address during the powering down in the register in the logic circuit;
powering the processor up subsequent to the powering down, wherein powering up the processor includes restoring the power supply voltage to the processor;
resetting the processor subsequent to the power up;
the processor capturing the reset vector address from the register in the logic circuit in a reset vector base address register in the processor responsive to the resetting, wherein the logic circuit is configured to provide the reset vector address on an input to the processor; and
releasing the processor from reset responsive to completing the resetting.

7. The method as recited in claim 6 further comprising releasing the processor from reset, wherein the processor begins fetching responsive to the reset vector base address and responsive to the releasing.

8. The method as recited in claim 6 further comprising determining that code to be executed responsive to reset is to be relocated, wherein the programming is responsive to the determining.

9. The method as recited in claim 8 wherein the determining is responsive to ensuring security of the code.

10. The method as recited in claim 8 wherein the determining is responsive to freeing a memory page storing the code for allocation to other data.

11. The method as recited in claim 10 further comprising, prior to the powering down:
allocating a different memory page to store the code;
loading the code into the different memory page; and
wherein the programming sets the reset vector address to indicate the different memory page.

12. The method as recited in claim 6 further comprising determining that different code is to be executed for subsequent resets responsive to an initial reset of the processor, wherein the programming is responsive to the determining.

13. A non-transitory computer accessible storage medium comprising a plurality of instructions executable on a processor in an integrated circuit to:

determine a reset vector address to be used by the processor in a subsequent reset of the processor; and
program a register in a logic circuit external to the processor with the reset vector address, wherein the logic circuit is configured to remain powered during a time that the integrated circuit is powered but the processor is powered down, and wherein the processor is powered down by interrupting a power supply voltage to the processor and the processor is powered up by restoring the power supply voltage to the processor, and wherein the logic circuit is configured to provide the reset vector address on an input to the processor during a reset of the processor, wherein the processor is configured to update a reset vector base address register within the processor with the reset vector address provided on the input responsive to a reset of the processor, and wherein the processor is configured to begin fetching from the reset vector address in the reset vector base address register responsive to being released from reset.

14. The non-transitory computer accessible storage medium as recited in claim 13 wherein the plurality of instructions that determine the reset vector address comprise a plurality of instructions which are executable to determine that the reset vector address is to be changed for security of reset code stored at the reset vector address.

15. The non-transitory computer accessible storage medium as recited in claim 13 wherein the plurality of instructions that determine the reset vector address comprise a plurality of instructions which are executable to determine that reset code has been relocated in memory by a paging mechanism implemented in a system that includes the integrated circuit.

16. The non-transitory computer accessible storage medium as recited in claim 15 wherein the plurality of instructions are further executable to:
allocate a page to store the reset code prior to powering down the processor; and
load the reset code into the page prior to powering down the processor.

17. The non-transitory computer accessible storage medium as recited in claim 13 wherein the plurality of instructions that determine the reset vector address comprise a plurality of instructions which are executable responsive to an initial power up of the processor.

18. An integrated circuit comprising:
one or more processors included in a first power domain of the integrated circuit, wherein each of the one or more processors includes a reset vector base address register, and wherein each of the one or more processors is configured to receive a reset vector address on an input to the processor to be captured into the reset vector base address register responsive to reset of the processor, and wherein the processor is released from reset responsive to a reset of the processor completing;
a control circuit included in a second power domain of the integrated circuit, wherein the control circuit comprises at least one register programmable with the reset vector address for at least one of the one or more processors, wherein the at least one register is coupled to the input to the at least one of the one or more processors, and wherein the second power domain is independent of the first power domain; and
a power manager circuit configured to control a power up and a power down of the first power domain, wherein the second power domain remains powered up if the integrated circuit is powered, wherein power down of the first power domain includes interrupting a power supply voltage to the first power domain and power up of the first power domain includes restoring the power supply voltage to the to the first power domain.

19. The integrated circuit as recited in claim 18 wherein the control circuit is coupled to receive a write operation issued by the processor to update the at least one register.

20. The integrated circuit as recited in claim 19 wherein the processor is configured to issue the write operation responsive to executing one or more instructions while the processor is powered up.

* * * * *